United States Patent [19]

Rosen

[11] Patent Number: 4,985,258

[45] Date of Patent: Jan. 15, 1991

[54] PICKLING KIT AND PROCESS

[75] Inventor: Charles A. Rosen, Atherton, Calif.

[73] Assignee: Cultured Foods Corporation, Mt. View, Calif.

[21] Appl. No.: 288,590

[22] Filed: Dec. 22, 1988

[51] Int. Cl.$^5$ .............................................. A23L 1/218
[52] U.S. Cl. ......................................... 426/8; 426/52; 426/61
[58] Field of Search .......................... 426/61, 8, 49, 52

[56] References Cited

U.S. PATENT DOCUMENTS 723,693 3/1903 Loder .
3,209,674 10/1965 Payne .
3,255,019 6/1966 Engelland .
3,403,032 9/1968 Etchells et al. .
3,993,784 11/1976 Bell et al. .
4,579,734 4/1986 Hata et al. .
4,666,849 5/1987 Daeschel et al. .

Primary Examiner—Marianne Cintins
Attorney, Agent, or Firm—Townsend and Townsend

[57] ABSTRACT

A kit and method for lactic acid fermentation to produce pickled vegetables. Mixed cultures of lactic acid-producing bacteria and antioxidants are provided in an initially highly acidic pickling solution to result in relatively rapid, foolproof fermentation. The acidity and anaerobic conditions minimize spoilage bacteria and molds from growing. The mixed cultures of lactobacilli provide for continuous fermentation as the acidity changes over time. The antioxidants prevent the spoilage bacteria and molds from growing without negatively impacting the fermentation reactions.

2 Claims, No Drawings

PICKLING KIT AND PROCESS

FIELD OF THE INVENTION

The present invention provides a method and a self-contained kit for the rapid and foolproof pickling of cucumbers, tomatoes, cabbage and other vegetables in small scale batches through lactic acid fermentation.

BACKGROUND OF THE INVENTION

The preservation of foodstuffs by pickling has been known and used for hundreds of years. Numerous commercial processes have been developed for large scale pickling, as illustrated in U.S. Pat. Nos. 723,693, 3,255,918 and 3,403,032.

In recent years, with the interest in natural health foods which contain a minimum of artificial preservatives and other color and flavor enhancing additives, it has become desirable for individuals to prepare small batches of pickles and other vegetables in the home. Some pickling processes may involve the use of special yeasts as fermenting agents, although these methods usually produce an inferior, less tasty end product. Although there are also non-fermentation pickling processes, such as those which utilize brine and vinegar, the true "old-fashioned" sour pickle flavor is achieved with lactic acid fermentation.

Lactic acid fermentation has been used to pickle cucumbers, tomatoes, cabbage (sauerkraut and kimchee), and other fresh vegetables for many years. This process is considered to yield superior flavor and texture in the final product. However, this process is sensitive to many factors which will affect the resulting pickled vegetables and make the process difficult for the inexperienced pickler to carry out.

Lactic acid fermentation pickling is difficult to control because the desired fermentation process must be encouraged while the undesirable molds and bacterial growths must simultaneously be inhibited. The lactic acid-producing bacteria responsible for the fermentation reaction must be appropriately maintained in anaerobic conditions and fed without concurrently producing unwanted biological activity. Further, by controlling the salinity and pH of the pickling solution, the growth of spoilage microorganisms is greatly inhibited while the growth of a selection of desired lactobacilli species is enhanced, resulting in relatively high populations of desirable bacteria compared to populations of undesirable bacteria. Consequently, the available nutrients are depleted along with the production of desirable lactic and acetic acids, without appreciable production of undesirable components, and all subsequent biological activity is terminated.

SUMMARY OF THE INVENTION

The present invention provides a kit, special ingredients, and a process designed for the rapid, foolproof, small scale pickling of vegetables by lactic acid fermentation.

DETAILED DESCRIPTION OF THE PREFERRED EMBODIMENTS

The home fermentation kit contains the following components:

1. A wide-mouthed plastic or glass container, having a fitted disk which can be inserted inside of the container to cover the surface of the pickling liquid. Traditionally, a quart container holding approximately fourteen ounces of water is used. When the container is filled with liquid and other ingredients, the disk serves to maintain the vegetables in a submerged state and to prevent air from contacting the pickling materials. The isolation of the ingredients from the surrounding air is important to foster the lactic acid production by the lactobacilli under anaerobic conditions. Also, the biological activity of unwanted molds, yeasts, and bacteria which cause spoilage is minimized by the anaerobic environment;

2. A packet of pre-mixed, dry, pickling ingredients selected to optimize the desired lactic acid fermentation reaction and to inhibit the spoilage mechanisms. All necessary ingredients are provided in a single packet to simplify the process and minimize errors. The only ingredients provided by the user are water and the fresh vegetable to be pickled. Minimum preservatives are added to control mold, the major preservation being obtained by the natural salts and acids provided in the packet of pickling ingredients. The formulation of ingredients preserves the pickled products for well over a month if kept under refrigeration. The specific ingredients provided in the packet can be classified into three groups:

(a) Lactic acid-producing bacteria and associated nutrients

A quantity of several mixed cultures of freeze-dried lactic acid-producing bacteria sufficient to guarantee an overabundance of desired fermenting bacteria compared with the inevitably present contaminating bacteria and molds is provided. More than 250 million microorganisms per quart container are added to the pickling ingredients. Measured quantities of nutrients for the lactic acid-producing bacteria such as natural sugars and pectin are also included. These nutrients insure a rapid start of the fermentation process.

In the past, the home pickler has relied on the fortuitous presence of lactobacilli that may have adhered to the surface of the green vegetables or fresh spices used in the pickling mixture. In the washing of the vegetables prior to pickling, the population of all molds and bacteria, including the desirable lactobacilli, is drastically reduced. This made prior home-pickling processes unpredictable, and often, unsuccessful.

The present invention provides a large population of several different cultures of desired lactic acid-producing bacteria provided in a mixed combination to ensure initial and continued lactic acid fermentation. For example, the microorganism, Leuconostoc Mesenteroides, is known to vigorously produce lactic acid at room temperatures under conditions of relatively low total acidity and to stop functioning as acidity rises. At this point, other microorganisms, such as Lactobacillus Plantarum, L. Brevis, and L. Acidophilus, can take over the fermentation since they can function well at high acidities. Thus, the present invention provides measured quantities of several different lactic-acid cultures which can successfully continue desired lactic acid production as the total acidity rises. An overabundance of lactobacilli also tends to inhibit the competing spoilage processes because of the dominance of the desired fermentation reaction. With the provision of the "good" bacteria, careful washing and cleaning of the vegetables to be pickled is made highly desirable from the standpoint of hygiene, and does not affect the end results.

A measured quantity of a mixture of citric, ascorbic and sorbic acids is provided to act as a mold and yeast inhibitor. After the initial phase of rapid fermentation, it is preferable to refrigerate the jar to slow the fermentation process and thus increase the quality and longevity of the pickled product. The molds and yeasts can produce undesirable end products even at low temperatures and must be strongly inhibited.

(b) Ingredients Optimizing Anaerobic Fermentation

Lactic acid fermentation reactions are favored over competing spoilage bacteria under conditions of relatively high salinity and low pH (high acidity), and in the absence of oxygen (anaerobic conditions). These are precisely the conditions which inhibit the undesirable spoilage processes caused by foreign bacteria and molds. The packet of pickling ingredients contains a mixture of predetermined quantities of salt, citric, sorbic and ascorbic acids. The combined acids constitute about 1% by weight concentration of the initial brine to produce an initial brining and pickling solution which contains at least 5% by weight of salt, with an initial pH less than 2.5.

After several days of fermentation the salinity drops to about 2% and the pH rises to a value between 3.2 and 3.8, which appears to be optimum for flavor, crispness and preservation under refrigeration of the final product. The relative proportions of salt, sorbic, citric and ascorbic acid in the ingredients determines these desired properties.

The ultimate combination of lactic, citric, and ascorbic acids acts as a natural preservative and antioxidant to prolong the refrigerated shelf-life of the product. The addition of one artificial preservative, sorbic acid, strongly inhibits the formation of molds and yeasts, which can cause spoilage at refrigeration temperatures.

The unusually high acidity, achieved by adding up to $\frac{1}{2}$% by weight of a mixture of sorbic, citric and ascorbic acids, simultaneously strongly inhibits the growth of undesirable bacteria yet permits growth of L. Mesenteroides, L. Acidophilus, L. Brevis and L. Plantarum. Souring during the first 3 days is rapid, unlike prior art processes which usually take 7-10 days. This can be attributed to the overabundance of the supplied lactic acid-producing bacteria and the optimal fermentation conditions.

The antioxidant mixture of citric, ascorbic and sorbic acid provides the low pH (initially less than 2.5) for the pickling process and also acts as a preservative, regardless of the amount of lactic acid generated by the fermentation. This combination of acids is a substitute for the usual addition of acetic acid (vinegar—5% acetic acid) commonly used for preservation of pickled products. Additionally, the acids are selectively antibacterial, as well as functioning as antioxidants. For instance, the mixture of acids will kill deleterious bacteria such as clostridium botulinum and salmonella.

The use of mixed bacteria cultures results in the self-regulated and continual growth of the desired bacteria as the acidity increases. During the rapid initial stages of fermentation, L. Mesenteroides is the primary fermenter, as it performs well at total acidities of less than 1% by weight (as obtained by titration reckoned against lactic acid). Subsequently, the other bacterial cultures, such as L. Plantarum, L. Acidophilus and L. Brevis, can then continue fermentation, at a slower pace and under more highly acidic conditions. Throughout this process, the conditions disfavor growth of undesirable bacteria, molds or yeasts.

By enclosing the environment with the loosely-fitted lid on the jar, exposure of the pickling mixture to air is minimized. Carbon dioxide gas formed during fermentation during the process is slightly heavier than the air outside the jar and is entrapped in the area between the top of the pickling mixture and the lid. This carbon dioxide blanket maintains the anaerobic environment. The submersion disk also prevents the vegetables and other solid particles from being exposed to air. The carbon dioxide blanket and the use of the submersion disk eliminate the formation of floating molds and malodorous compounds produced by spoilage bacteria, which in the past often plagued semi-aerobic conditions.

(c) Herbs and Spices

Various herbs and spices separately contained in a perforated plastic pouch can be included in the packet of pickling ingredients to enhance the flavor of the pickled product. The selection of spices is dependent on the vegetables intended to be pickled. The pickler is also free to augment the provided spices to conform to his or her individual taste. A large variety of dry spices such as dill, black pepper, white pepper, red pepper, mustard seed, coriander, bay leaves, garlic flakes and caraway seeds are customary. A small quantity of cloves are also sometimes added for flavor and also for natural mold-inhibition.

Many of the spices are provided in physical particles which are very light and would tend to float on the surface of the brine, instead of in solution with the liquid pickling mixture. To facilitate submersion of the spices, a plastic perforated pouch contains and surrounds the spices, while sinking into the liquid solution. This pouch is also useful for preventing the spice particles from becoming loose in the liquid solution and becoming discolored and unattractive in the final product.

GENERAL METHOD OF PREPARATION

In general, pickles are prepared in the following fashion:

1. About 1 pound of fresh, cleaned and unblemished pickling cucumbers or other vegetables are snugly packed into a quart-sized wide mouthed jar. About 1 and $\frac{1}{4}$ inches of clear vertical space must be left at the top of the jar.

2. The perforated pouch of spices is wedged in amongst the cucumbers or vegetables, taking care not to break or tear the pouch membrane.

3. The contents of the packet of pickling ingredients is vigorously mixed with warm water, which is then added to the jar. The solution is added up to within a half inch from the top of the jar.

4. The liquid surface is skimmed to remove any floating particles. A submersion disk is wedged within the jar atop the mixture of spices, liquid and vegetables. The submersion disk keeps the vegetables and spices below the surface of the liquid and away from contact with air, to maintain anaerobic conditions.

5. The cover of the jar is loosely applied so that carbon dioxide gas produced during the fermentation process will not build up excessive pressure. The jar is kept at room temperature for three days. By the end of this time, the pickles should be one half to three quarters soured and can be sampled in this condition. The jar should then be refrigerated for further curing and preservation of the contents. Fermentation will continue at a much slower rate under refrigerated conditions, reaching full sourness in about 10 to 20 days. The fully-cured pickles will remain crisp and tasty for three to four weeks.

DETAILED DESCRIPTION OF THE PREFERRED EMBODIMENTS

Example 1: Kosher-style dill pickles

The following quantities of dry ingredients will yield a quart container of Kosher-style dill pickles, starting with approximately 1 lb of whole, unblemished pickling sized cucumbers carefully washed and packed into a wide-mouthed quart container:

500 mgs mixed cultures—L. Mesenteroides, L. Acidophilus, L. Plantarum

| | |
|---|---|
| 100 mgs | pectin |
| 7 g | cane sugar |
| 20 g | uniodized salt |
| 1½ g | ascorbic acid |
| 4 g | citric acid |
| 500 mg | sorbic acid |

Spices in perforated pouch:

| | |
|---|---|
| 2 g | dill seed |
| 3 g | garlic flakes |
| 2 g | mixed spices (pepper flakes, cloves, coriander, mustard seed, bay leaves) |

Warm water mixed with the dry ingredients and the spice pouch are placed in the container beneath the submersion disk. The loosely covered container is kept at room temperature (65 to 75 degrees F.) for three days. The longer the fermentation is permitted to continue at this stage, the more acidic the flavor of the end product. The container is then tightly capped and its contents are then refrigerated to slow the fermentation process. Fermentation continues with fuller development of the flavor and acidity.

Example 2: Sauerkraut

Coarsely shredded green cabbage (1¼ lbs) is intimately mixed with the following dried ingredients:

| | |
|---|---|
| 500 mg | mixed cultures - L. Mesenteroides, L. Acidophilus, L. Plantarum |
| 100 mg | pectin |
| 25 g | uniodized salt |
| 7 g | cane sugar |
| 4 g | citric acid |
| 1½ g | ascorbic acid |
| 500 mg | sorbic acid |

Spices in perforated pouch:

| | |
|---|---|
| 3 g | caraway seeds |
| 500 mg | pepper flakes |

The cabbage and other ingredients are snugly packed into a quart container to within one inch of the top. Warm water is added to completely surround the mixture and the spice pouch is inserted. The submersion disk is wedged atop the ingredients. The loosely covered container is then kept at room temperature (65 to 75 degrees F.) for three days. The cover is then tightened, and fermentation can continue under refrigeration.

What is claimed is:

1. A pickling kit for pickling vegetables through lactic acid fermentation comprising:
   (a) a container; and
   (b) pickling ingredients comprising:
   (i) a pre-measured amount of lactic acid-producing bacteria in an amount sufficient for production of acid throughout a fermentation process, said lactic acid-producing bacteria comprising L. Mesenteroides in combination with one of the group consisting of L. Acidophilus, L. Plantarum, and L. Brevis;
   (ii) a sufficient amount of acid for providing an initial pH of less than 2.5, said acid comprising at least citric, ascorbic, and sorbic acids;
   (iii) nutrients for said lactic acid producing bacteria;
   (iv) sufficient salt to provide solution of at least about 5% by weight of salt; and
   (v) herbs and spices.

2. A method for lactic-acid fermentation pickling of vegetables comprising the steps of:
   (a) packing a quantity of vegetables into a container;
   (b) mixing pre-selected pickling ingredients with water and pouring the resulting pickling liquid into said container of vegetables, said pickling ingredients comprising:
   (i) a pre-measured amount of lactic acid-producing bacteria in an amount sufficient for production of acid throughout a fermentation process, said lactic acid-producing bacteria comprising L. Mesenteroides in combination with one of the group consisting of L. Acidophilus, L. Plantarum, and L. Brevis;
   (ii) a sufficient amount of acid for providing an initial pH of less than 2.5, said acid comprising at least citric, ascorbic, and sorbic acids;
   (iii) nutrients for said lactic acid producing bacteria;
   (iv) sufficient salt to provide solution of at least about 5% by weight of salt; and
   (v) herbs and spices; and
   (c) permitting said vegetables to ferment over a period of time under anaerobic conditions.

* * * * *